(12) United States Patent
Gokhale et al.

(10) Patent No.: US 6,741,059 B2
(45) Date of Patent: May 25, 2004

(54) CONTROLLER FOR A WOUND ROTOR SLIP RING INDUCTION MACHINE

(75) Inventors: Kalyan P. Gokhale, New Berlin, WI (US); Douglas W. Karraker, Muskego, WI (US); Samuli J. Heikkilä, Helsinki (FI)

(73) Assignees: ABB Automation Inc., Norwalk, CT (US); ABB Industry Oy, Helsinki (FI)

( * ) Notice: Subject to any disclaimer, the term of this patent is extended or adjusted under 35 U.S.C. 154(b) by 0 days.

(21) Appl. No.: 10/200,689

(22) Filed: Jul. 22, 2002

(65) Prior Publication Data

US 2003/0071596 A1 Apr. 17, 2003

Related U.S. Application Data

(62) Division of application No. 09/842,998, filed on Apr. 26, 2001, now Pat. No. 6,448,735.

(51) Int. Cl.$^7$ .................................................. H02P 7/36
(52) U.S. Cl. .................... 318/700; 318/729; 318/438; 318/494; 318/521; 318/504; 318/705
(58) Field of Search ................................ 318/727, 729, 318/700, 438, 494, 521, 504, 705, 723, 798, 801, 805, 530

(56) References Cited

U.S. PATENT DOCUMENTS

| | | | | | |
|---|---|---|---|---|---|
| 4,918,367 | A | * | 4/1990 | Pohjalainen | 318/801 |
| 4,982,147 | A | * | 1/1991 | Lauw | 318/729 |
| 5,239,251 | A | * | 8/1993 | Lauw | 318/767 |
| 5,334,923 | A | * | 8/1994 | Lorenz et al. | 318/805 |
| 5,359,272 | A | * | 10/1994 | Liao | 318/732 |
| 5,387,855 | A | * | 2/1995 | Miyazaki et al. | 318/805 |
| 5,589,754 | A | * | 12/1996 | Heikkila | 318/805 |
| 5,798,631 | A | * | 8/1998 | Spee et al. | 322/25 |
| 6,396,236 | B1 | * | 5/2002 | Luukko | 318/700 |
| 6,448,735 | B1 | * | 9/2002 | Gokhale et al. | 318/700 |
| 6,509,711 | B1 | * | 1/2003 | Zaremba | 318/800 |

* cited by examiner

*Primary Examiner*—Rina Duda
*Assistant Examiner*—Patrick Miller
(74) *Attorney, Agent, or Firm*—Michael M. Rickin (57) ABSTRACT

The direct torque control (DTC) principle is used to control the torque of a wound ring rotor slip induction machine, also known as a doubly fed or cascade machine, by utilizing a solid state inverter on the rotor side. In addition, the DTC principle is used to control the power factor at the stator terminals of the doubly fed machine to a desired level and also to perform the task of synchronization of stator voltage to the grid voltage. An integrated controller is used to implement these three functions.

26 Claims, 6 Drawing Sheets

CONTROLLER FOR A WOUND ROTOR SLIP RING INDUCTION MACHINE

This application is a divisional of application Ser. No. 09/842,998 filed Apr. 26, 2001, now U.S. Pat. No. 6,448,735.

FIELD OF THE INVENTION

This invention relates to doubly fed induction generators and more particularly to the control of the torque and power factor of such generators and the synchronization thereof to the utility grid.

DESCRIPTION OF THE PRIOR ART

An induction machine with a wound rotor and slip rings is one of the possible generator configurations used in a wind power generation system. A similar machine is also used as a variable speed drive for some drives applications in the cement and minerals industries. Such a machine is also called a doubly fed or cascade machine because the electrical power is applied at the stator as well as at the rotor terminals.

In either of the applications described above, the stator winding is connected to the utility grid and a three phase inverter is connected to the rotor windings through slip rings. An electronic controller is used to control the on-off states of the inverter switches to thereby control the torque of the machine. In the wind power generator, the electronic torque controller can be used to control the desired amount of generated electrical power while in the variable speed drive, the torque controller is used to control the speed of the motor. In addition, the same torque controller can also be used to control the power factor of the generator or the drive system to a desired level which is normally equal to 1. In the generator application, the torque controller also performs the task of "synchronization" so that the generator system can be connected to or disconnected from the utility grid without any disruptive voltage and current transients.

A method to control the torque of a doubly fed machine is described in the published PCT patent application WO 99/07996. Such a torque control technique is based on a well known and published method called Field Oriented Control or Vector Control of induction machines.

Figure 1:
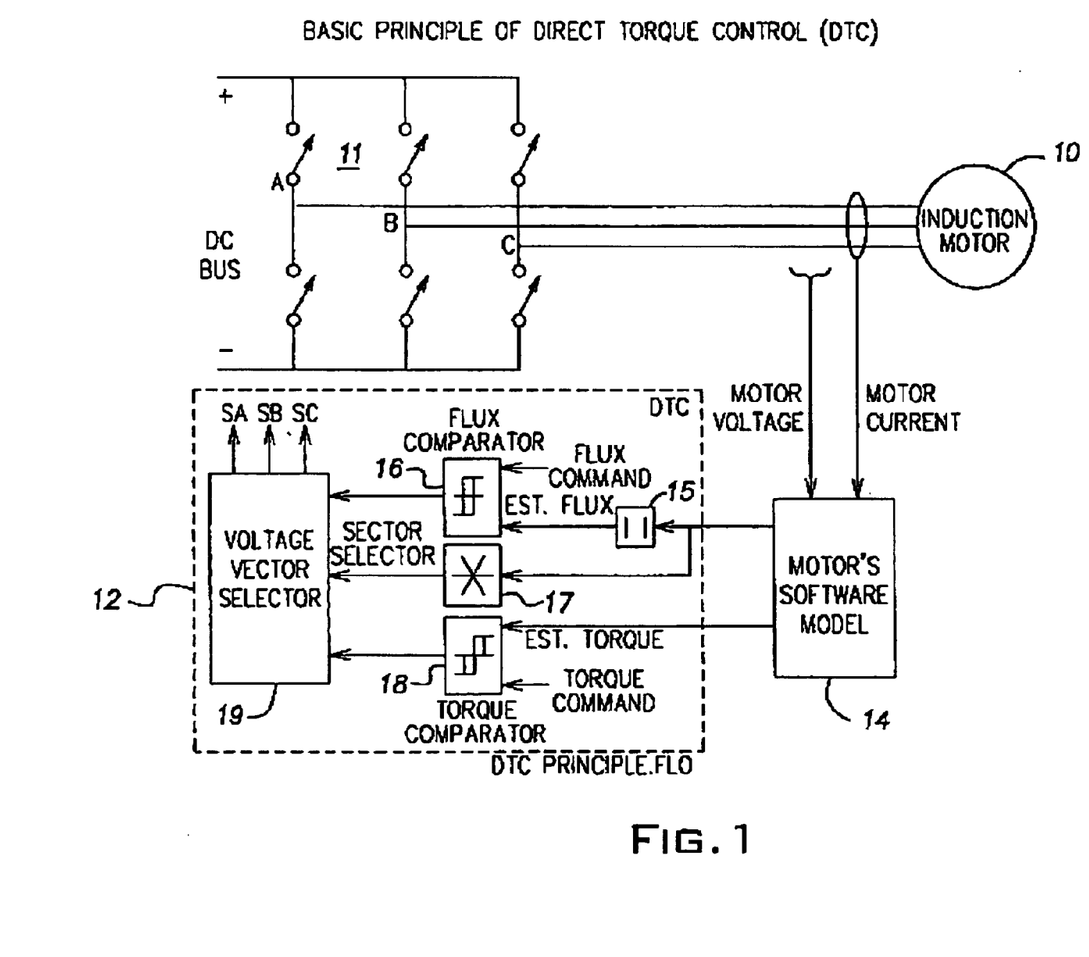
FIG. 1 is a block diagram showing the direct torque control of an induction machine which is not a doubly fed machine.

U.S. Pat. No. 4,918,367 ("the '367 patent") which is assigned to an entity related to the assignee of the present invention describes a technique called Direct Torque Control (DTC) to control the torque of a squirrel cage induction machine whose stator is fed by a three-phase inverter. The DTC technique controls the torque of the squirrel cage induction machine by directly controlling the state of the inverter switches based on the estimated value of the motor torque and motor flux. The motor model (in software) uses the measured values of the motor voltages and currents and estimates the torque and the stator flux. FIG. 1 shows the principle of DTC of an induction machine 10 which is not a doubly fed induction machine.

The DTC block 12 receives torque and flux commands and the motor model 14 supplies the estimated motor torque and estimated motor flux as feed back signals to block 12. Block 12 includes flux comparator 16 and torque comparator 18 to determine a flux and torque error, respectively, as the difference between the estimated motor flux and estimated motor torque and the associated command. Based on the torque and flux errors, the DTC block 12 chooses the one of the possible eight inverter voltage vectors (six non zero and two zero), which tend to "pull" the stator flux vector $\psi$s, to control the "movement" of the stator flux with respect to the rotor flux. Since the torque is proportional to the area of the triangle formed by the stator and rotor flux vectors $\psi$s and $\psi$r, the torque can be increased or decreased by advancing or retarding the stator flux vector $\psi$s with respect to the rotor flux vector $\psi$r by choosing appropriate voltage vectors.

The "voltage vector selector" 19 of DTC block 12 selects one of the eight possible inverter voltage vectors based on the outputs of the flux and torque comparators 16, 18 and the present sector location of the stator flux vector $\psi$s as determined by sector selector 17. The logical outputs SA, SB, SC of voltage vector selector 19 represent the desired (on or off) states of the inverter switches 11. The inverter 11 has upper and lower switches for each of the three phases A, B and C. When output SA=1 or SB=1 or SC=1, the phase A or phase B or phase C upper inverter switch is on and lower inverter switch is off. When output SA=0 or SB=0 or SC=0, the phase A or phase B or phase C upper inverter switch is off and lower inverter switch is on.

It is desirable to use the principle of DTC to control the torque of a doubly fed induction machine. More particularly, it is desirable to use the principle of DTC to control the torque of such a machine used in a wind power generation system. Further it is also desirable to use the principle of DTC to control the power factor at the stator terminals of the doubly fed machine to a desired level and also to perform synchronization of the wind power generation system that uses a doubly fed machine. The controller of the present invention allows the principle of DTC to be applied in all of the foregoing aspects to a system that uses a doubly fed machine and more particularly to a wind power generation system that uses such a machine.

SUMMARY OF THE INVENTION

An apparatus for controlling the torque and power factor of a doubly fed machine using direct torque control. The apparatus has:

(a) means for calculating the estimated torque of the machine and the desired rotor flux command $\Psi r\_ref$;

(b) means for calculating the actual rotor flux $\Psi r$ and converting the actual rotor flux from the stator reference frame to the rotor reference frame by multiplying $\Psi r$ by $e^{-j\theta m}$; and (c) means for determining a torque error from the estimated torque and a reference torque, and a flux error from the desired rotor flux command and the actual rotor flux converted to the rotor reference frame, the determining means selecting an inverter voltage vector from the torque error and the flux error.

An apparatus for synchronizing a doubly fed machine having an induced stator voltage using direct torque control to an electrical grid having a grid voltage by controlling the tangential motion and radial length of a flux vector for the rotor of the machine. The apparatus has:

(a) means for determining the stator flux vector from the induced stator voltage and the grid flux vector from the grid voltage, the determining means calculating the angular error between the stator flux vector and the grid flux vector;

(b) means for calculating the desired rotor flux command $\Psi r\_ref$;

(c) means for calculating the actual rotor flux $\Psi r$ and for converting the actual rotor flux from the stator reference frame to the rotor reference frame by multiplying $\Psi r$ by $e^{-j\theta m}$; and (d) means for comparing the angular error to zero to determine an error signal for controlling the rotor flux vector tangential motion, determining a flux error from the desired rotor flux command and the actual rotor flux converted to the rotor reference frame, the flux error for controlling the rotor flux vector radial length, and selecting an inverter voltage vector from the torque error and the flux error.

An apparatus for synchronizing a doubly fed machine having an induced stator flux vector using direct torque control to an electrical grid having a grid flux vector by controlling the tangential motion and radial length of a rotor flux vector for the machine. The apparatus has:

(a) means for calculating the angular error between the stator flux vector and the grid flux vector;

(b) means for calculating the desired rotor flux command $\Psi r\_ref$;

(c) means for calculating the actual rotor flux and converting the actual rotor flux from the stator reference frame to the rotor reference frame by multiplying $\Psi r$ by $e^{-j\Theta m}$; and (d) means for comparing the angular error to zero to determine an error signal for controlling the rotor flux vector tangential motion, determining a flux error from the desired rotor flux command and the actual rotor flux converted to the rotor reference frame, the flux error for controlling the rotor flux vector radial length, and selecting an inverter voltage vector from the torque error and the flux error.

A controller for controlling the torque and power factor of a doubly fed machine using direct torque control. The controller has:

switch means for selecting either a first operating mode of the controller for controlling the torque and power factor of the machine or a second operating mode of the controller for synchronizing the machine to an electrical grid;

the controller comprising when the first operating mode is selected:

means for calculating the estimated torque of the machine;

means for calculating the desired rotor flux command $\Psi r\_ref$;

means for calculating the actual rotor flux $\Psi r$ and converting the actual rotor flux from the stator reference frame to the rotor reference frame by multiplying $\Psi r$ by $e^{-j\Theta m}$; and means for determining a torque error from the estimated torque and a reference torque and a flux error from the desired rotor flux command and the actual rotor flux converted to the rotor reference frame and for selecting an inverter voltage vector from the torque error and the flux error.

DESCRIPTION OF THE PREFERRED EMBODIMENT(S)

Figure 2:
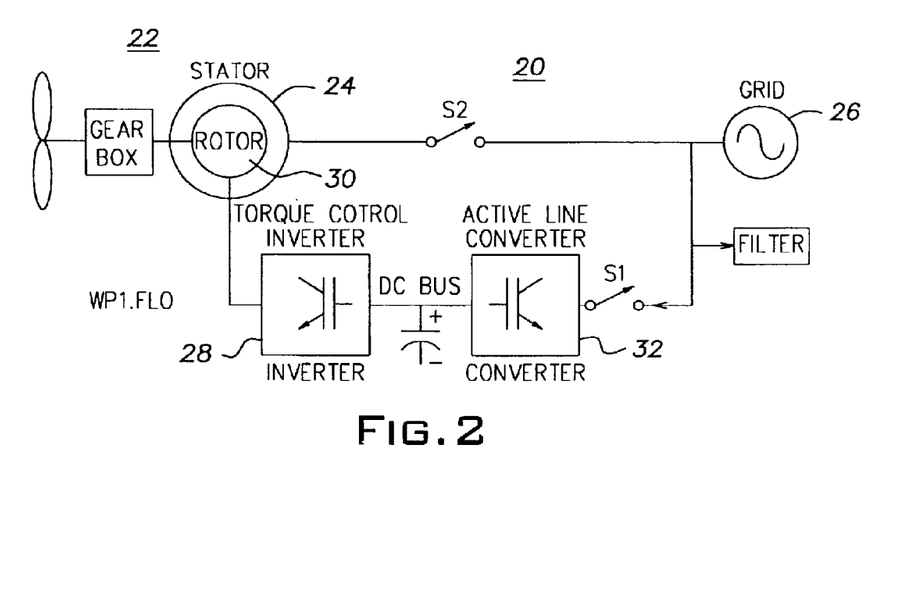
FIG. 2 is a block diagram of a wind power generator system that uses a doubly fed induction machine with direct torque control.
Figure 6:
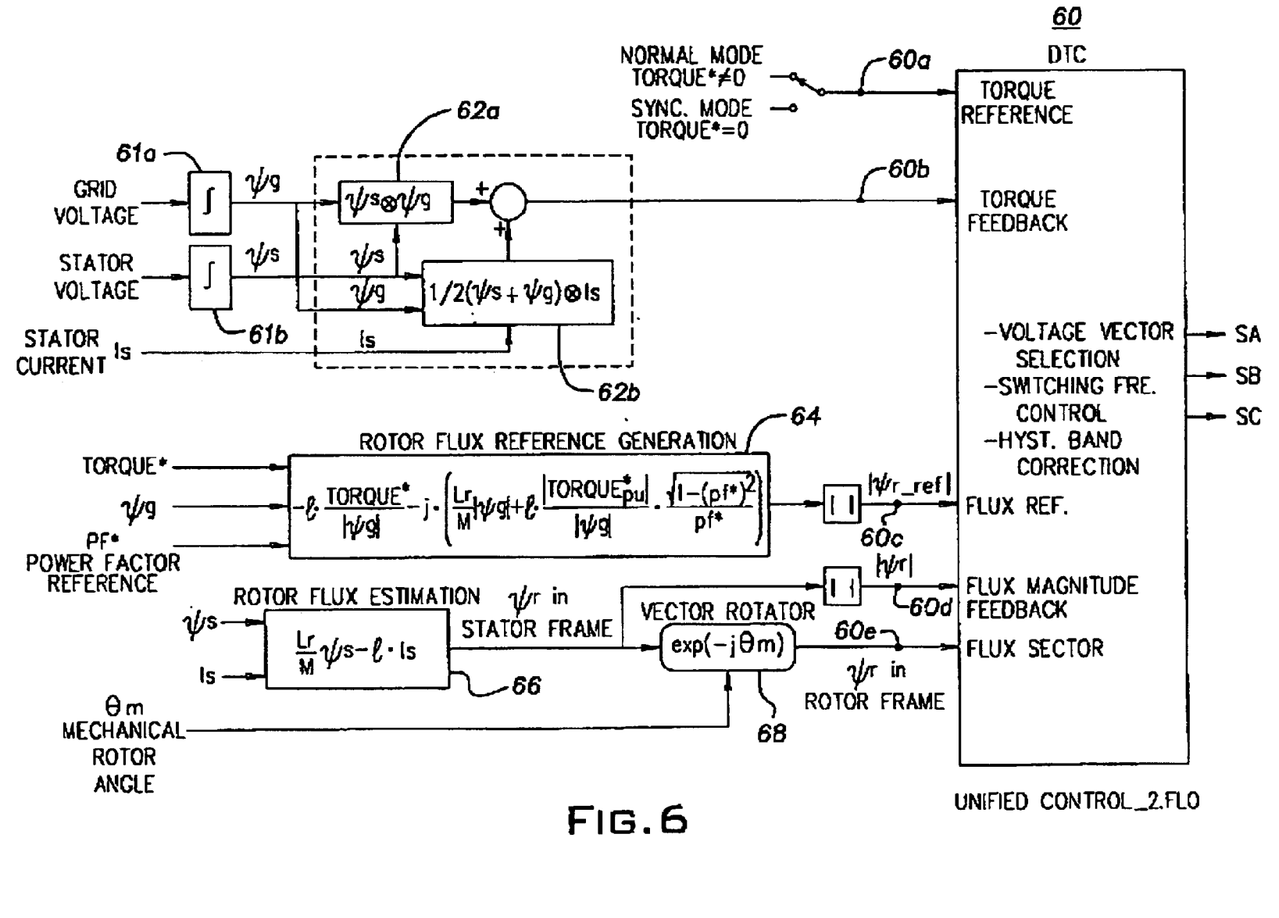
FIG. 6 is a block diagram for a controller that in accordance with the present invention uses direct torque control of a doubly fed induction to control the torque and power of the machine and the synchronization of the machine to the grid.
Figure 7:
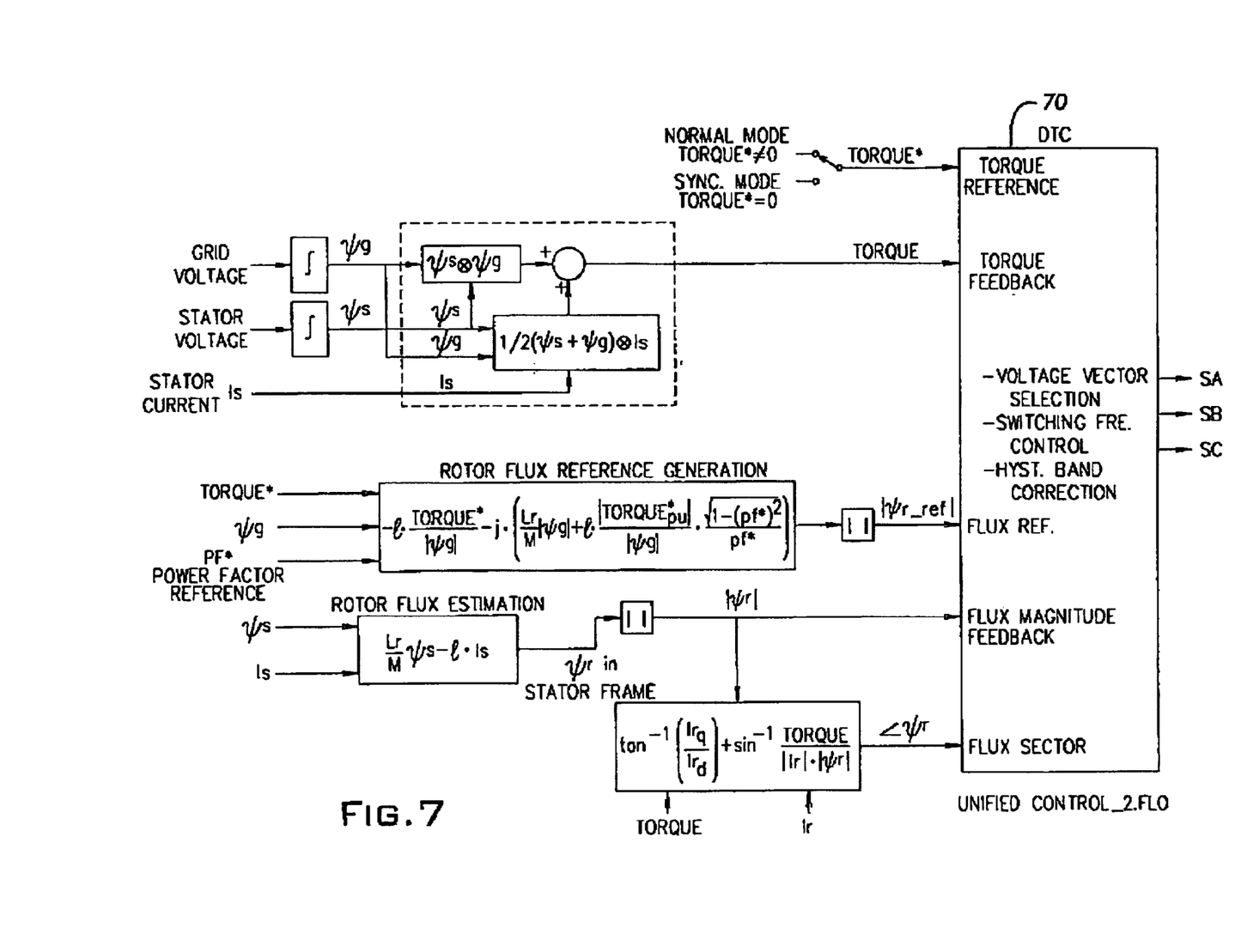
FIG. 7 is a block diagram for a controller that in accordance with the present invention uses direct torque control of a doubly fed induction to control the torque and power of the machine and the synchronization of the machine to the grid without using a rotor position sensor.

FIG. 2 shows the block diagram of a wind power generator system 20 that uses a doubly fed induction machine 22 and the controller of the present invention which is not shown in FIG. 2 but is shown in its entirety in FIG. 6. Although all the description below is in the context of a wind power generation system, the description is equally applicable to a variable speed drive system that uses a doubly fed induction machine. The stator 24 of the induction machine 22 is connected to the grid 26 via switch S2 and the torque is controlled from the rotor side 30 of machine 22 by using a variable voltage and variable frequency inverter 28.

In the normal operation, the rotor 30 of machine 22 is rotating due to the wind energy within a certain speed range. The typical value for the operational speed range is ±30% around the synchronous speed which (in rpm) is given by $$\frac{120 \cdot f_{grid}}{poles}.$$

The stator 24 is connected to the grid poles 26 and the rotor 30 is connected to the dc-to-ac inverter 28. An electronic controller embodied in accordance with the present invention which is not shown in FIG. 2 but is shown in its entirety in FIG. 6 controls the inverter 28 output voltage, current and frequency so that the desired torque (therefore desired electrical power output) and the desired power factor at the stator terminal is achieved.

If the mechanical speed of the rotor 30 is lower than the synchronous speed, the power is delivered from the grid 26 to the rotor windings via the torque control inverter 28. If the mechanical speed of the rotor 30 is higher than the synchronous speed, the power is delivered to the inverter 28 and thus to grid 26 from the rotor windings. Therefore, it is necessary to have another solid state inverter in the form of active line converter 32 to control the bi-directional power flow between grid 26 and the inverter 28. The converter 32 is well known and well understood to those of ordinary skill in the art and is available from many suppliers including an entity related to the assignee of the present invention.

A typical procedure required to connect the wind generating system 20 to the grid 26 so that the generating system 20 can start generating electrical power to grid 26 is as follows:

1. The system 20 is operational if the rotor speed is within a predetermined range, for example, 70% to 130% of the synchronous speed.

2. Switch S1 is closed (S2 is still open) to start the converter 32 and to establish the dc bus for the inverter 28.

3. The inverter 28 measures the grid voltage (input side of S2) and the stator voltage.

4. The controller for the inverter 28 is put into "Line Synchronization" mode. The rotor winding is "excited" so that the induced stator voltage is in phase with and has the same magnitude as the grid voltage.

5. The switch S2 is closed and the controller for the inverter 28 is put into the torque control mode and the controller is ready to accept the user's power factor (pf) and torque commands. The net power generated to the grid (from the stator port plus the rotor port) is nominally equal to the product of torque and mechanical speed.

The normal shut down procedure is as follows:

1. The system 20 is assumed to be in the torque control mode and the rotor speed is within the predetermined range, for example, 70% to 130% of the synchronous speed.

2. After receiving the shut down command, the torque command is set to zero and pf command is set to 1. Under this condition the stator current is zero.

3. The switch S2 is opened with zero voltage and zero current across it.

4. The inverter 28 and then the converter 32 is turned off.

As was described above, the original DTC technique was developed for a squirrel cage induction machine. In the doubly fed machine 22, as is shown in FIG. 2, the stator 24 is connected to the grid 26 and the inverter 28, connected to rotor 30, is used to control torque and pf. The inverter 28 is also used to achieve the line synchronization during start-up and shut down of the system.

A more generic view, as described below, of the DTC principle leads towards adapting the original DTC principle described in the '367 patent for the control of a doubly fed machine.

1. A flux vector at the output terminals of the inverter 28 can be defined as the integration of the inverter output voltage. This is the controlled flux vector since its radial length and its tangential motion can be controlled by appropriate selection of the inverter voltage vectors by directly controlling the ON/OFF states of the switches (not shown in FIG. 2) that comprise the inverter 28.

2. Usually the inverter 28 is connected as is shown in FIG. 2 to one of the windings (rotor 30 in FIG. 2) of the machine 22. Therefore, neglecting the resistive drops, it is possible to directly control the flux vector of that winding.

3. The DTC block 40 of FIG. 4 which is described in more detail in connection with that figure, selects the voltage vectors based on two error signals and the present sector of the controlled flux vector. One of the two error signals is the magnitude error in its radial length of the controlled flux vector and the other of the two error signals is the "angular" or "tangential" error between the controlled flux vector and any other vector. The 360° space is divided into six equal parts or (sectors) each 60° wide. The angle of the controlled flux vector is calculated using its real and imaginary parts. Then its sector is determined based on which 60° slot the angle belongs to. The magnitude error tends to select the voltage vectors along the length of the controlled flux vector. The tangential error tends to select voltage vectors that are perpendicular to the controlled flux vector. If both types of errors are present, then the preference is given to the tangential, that is, angular, error.

4. In a squirrel cage induction machine torque control problem (refer to FIG. 1), the torque is proportional to the angular difference between rotor flux (the other vector) $\psi r$ and the stator flux (the controlled flux vector) $\psi s$. Therefore, it was "logical" to use torque error to control the tangential motion of the stator flux. For any machine it is necessary to specify its operating flux level. Therefore, the magnitude of the stator (controlled) flux is a "logical" quality to control. Thus, the flux magnitude error of the stator (or controlled) flux is used to control its radial length.

5. In the strictest sense, the DTC principle controls the radial length and the angular motion of the controlled flux vector, which is usually the inverter flux, based on the two relevant errors and therefore the letter T (for torque in DTC is too restrictive.

6. The present invention uses the DTC principle to solve the three part problem of torque control, pf control and line synchronization of the doubly fed machine 22. Since the inverter 28 is connected to the rotor 30, the controlled flux vector, in this case, is the rotor flux vector Tr.

The torque and pf control mode of operation and the line synchronization mode of operation is now described.

(a) Torque and pf control mode of operation (S2 is closed in FIG. 2)—In this mode of operation, the "other vector" is the stator flux vector $\Psi s$. The torque is controlled by adjusting the angle between the rotor flux vector $\Psi r$ and the stator flux vector $\Psi s$ with the only difference being that in the present invention the rotor flux vector is "moved" with respect to the stator flux vector. The power factor can be controlled by choosing a proper magnitude reference for the rotor flux vector.

(b) Line synchronization mode operation (S2 is open in FIG. 2)—in this mode it is desired that the stator voltage should have the same magnitude and phase as that of the grid voltage. The grid voltage is integrated to produce the "grid flux" signal and the stator voltage is integrated to produce the stator flux signal. The magnitude error between these two is used to control the radial length of the rotor flux vector. When S2 is open, the stator flux vector is in phase with the rotor flux vector and is almost equal in magnitude to the rotor flux vector. The angular error between these two flux vectors is used to control the tangential motion of the rotor flux vector and therefore the tangential motion of the stator flux vector. With such a magnitude and the phase correction mechanism, the stator flux vector and therefore the stator voltage vector can be made equal in magnitude and in phase to the grid flux vector $\Psi g$ and therefore the grid voltage to achieve the desired synchronization.

The control of torque and power factor using the DTC principle adapted for use in controlling a doubly fed machine is now described in connection with FIG. 4 which shows the block diagram of a controller 40 using the adapted DTC principle that operates in a mode to provide control of the torque and power factor of the doubly fed machine 22. The torque reference is usually supplied by the user or some external controller (not shown). The torque of the machine is estimated using as is shown by computational block 46 a cross product of the stator flux vector Ψs and stator current Is. This torque is also proportional to the area of the triangle formed by the stator current and the stator flux vector. The difference between the desired and actual torque controls the tangential motion of the controlled flux, which in this case is the rotor flux.

Figure 3:
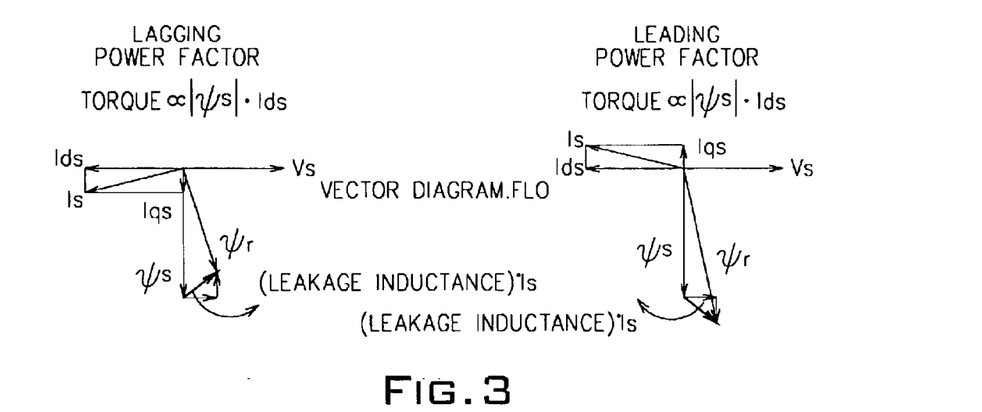
FIG. 3 shows the relationship of the measured stator flux, desired torque and power factor for a doubly fed induction machine that uses the direct torque control of the present invention.

The rotor flux (magnitude) command is derived from measured stator flux, desired torque and pf. It is also a function of the doubly fed motor's equivalent circuit parameters. FIG. 3 shows the relationship between these variables when the doubly fed machine 22 is used as a generator, that is, the torque is negative. The stator voltage is used as the reference vector. Neglecting the stator voltage drop, the stator flux ψs is lagging by 90°. In the generating mode, the torque producing component of stator current Ids would be at 180° with respect to the stator voltage. The magnitude and sign of the q-axis stator current Iqs would be dependent only upon the leading or lagging reactive power requirement (non-unity power factor).

The relationships between the rotor flux ψr, stator flux ψs, stator current Is, rotor current Ir, and rotor voltage Vr are given in Eqs. 1a, 1b, 1c and 1b. As is well known to those of ordinary skill in the art all of the vector quantities like fluxes, currents and voltages are complex variables. They are represented by real (d-axis) and imaginary (q-axis) parts.

$$\psi r = \frac{Lr}{M}\psi s - \frac{LsLr - M^2}{M}Is = \frac{Lr}{M}\psi s - l \cdot Is \qquad \text{Eq. 1a}$$

$$\psi r = \frac{M}{Ls}\psi s + \frac{LsLr - M^2}{Ls}Ir = \frac{M}{Ls}(\psi s + l \cdot Ir) \qquad \text{Eq. 1b}$$

$$\psi r = \int (Vr - Ir \cdot Rr) dt \qquad \text{Eq. 1c}$$

$$\psi r = Ir \cdot Lr + Is \cdot M \qquad \text{Eq. 1d}$$

Where Rr is rotor resistance and Ls, Lr and M are stator, rotor and mutual inductances of the machine 22. Generally Ls≈Lr and l is the leakage reactance which is defined as $$l = \frac{LsLr - M^2}{M} \qquad \text{Eq. 2}$$

The magnitude of the rotor flux command can be calculated from Eq. 1a by substituting ψs by the grid flux vector ψg because in normal operation they are the same and substituting Is by its expected value $Is_{exp}=Ids_{exp}+j \cdot Iqs_{exp}$ for a given torque command Torque* and desired power factor pf*. The $Ids_{exp}$ is proportional to the Torque* and $Iqs_{exp}$ is a function of the desired power factor pf* (Eq. 3a) or volt-amperes reactive var* (Eq. 3b).

$$Ids_{exp} = \frac{\text{Torque}^*}{|\psi g|} \quad Iqs_{exp} = \frac{|\text{Torque}^*|}{|\psi g|} \cdot \frac{\sqrt{1-(pf^*)^2}}{pf^*} \qquad \text{Eq. 3a}$$

$$Ids_{exp} = \frac{\text{Torque}^*}{|\psi g|} \quad Iqs_{exp} = \frac{\text{var}^*}{|\psi g| \cdot \omega e} \qquad \text{Eq. 3b}$$

where, ωe is stator electrical frequency.

The desired rotor flux command (a complex quantity) to obtain the desired torque and power factor is given by Eq. 4a. The desired rotor flux command to obtain the desired torque and volt-amperes reactive is given by Eq. 4b.

$$\psi r\_ref = \qquad \text{Eq. 4a}$$
$$-l \cdot \frac{\text{Torque}^*}{|\psi g|} - j \cdot \left( \frac{Lr}{M} \cdot |\psi g| + \frac{|\text{Torque}^*|}{|\psi g|} \cdot \frac{\sqrt{1-(pf^*)^2}}{pf^*} \right)$$

$$\psi r\_ref = -l \cdot \frac{\text{Torque}^*}{|\psi g|} - j \cdot \left( \frac{Lr}{M} \cdot |\psi g| + \frac{\text{var}^*}{|\psi g| \cdot \omega e} \right) \qquad \text{Eq. 4b}$$

The modulus (magnitude) of ψr_ref given by Eq. 4a is determined by the block named "Rotor Flux Ref. Calculation" in FIG. 4 and is used as the rotor flux command.

The rotor flux, for the feed back purposes, is derived using the stator flux and stator currents as in Eq. 1a. Its magnitude is used as a flux feedback.

Figure 4:
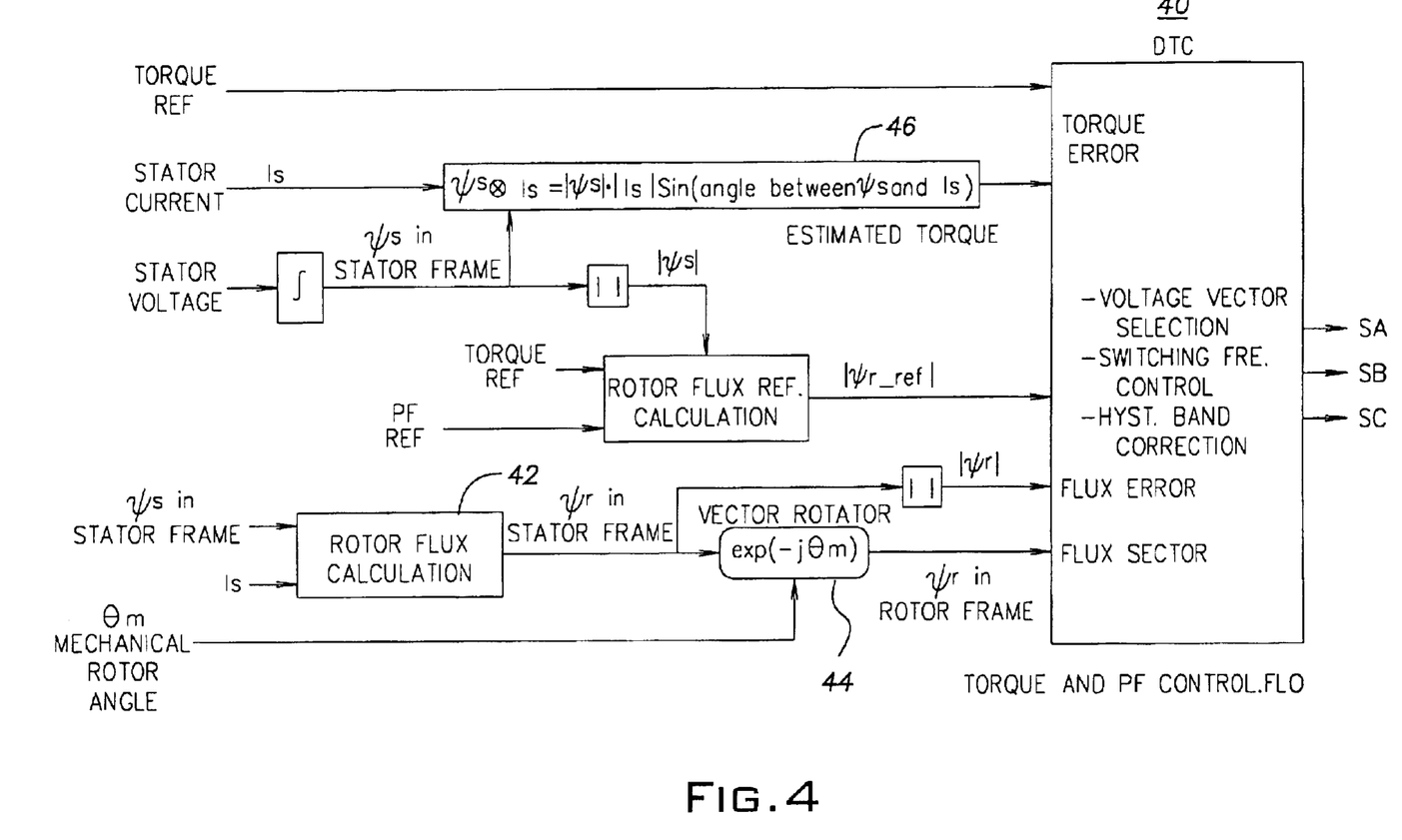
FIG. 4 shows a block diagram for a controller for direct torque control of a doubly fed induction machine operating in a mode to control the torque and power factor of the machine.

This calculation, shown by a computational block 42 in FIG. 4, gives the rotor flux in the stationary reference frame (or as seen from the stator side), that is, its rotational frequency is equal to the grid frequency. The actual rotor flux vector, however, rotates at the slip frequency which is equal to the difference between the stator (grid) frequency and the mechanical rotational frequency. Also the DTC block 40 requires the knowledge of the sector in which the actual rotor flux vector lies. Therefore, the estimate of the rotor flux vector given by Eq. 4a needs to be converted from the stator reference frame to the rotor reference frame. This is accomplished by a computational block 44 called vector rotator. The block 44 multiplies the rotor flux estimate (a complex quantity) in the stator frame by $e^{-j\theta m}$ and obtains the rotor flux estimate in the rotor frame so that its sector can be determined. The θm is the angular rotation of the axis of the rotor winding with respect to the axis of the stator winding.

Figure 5:
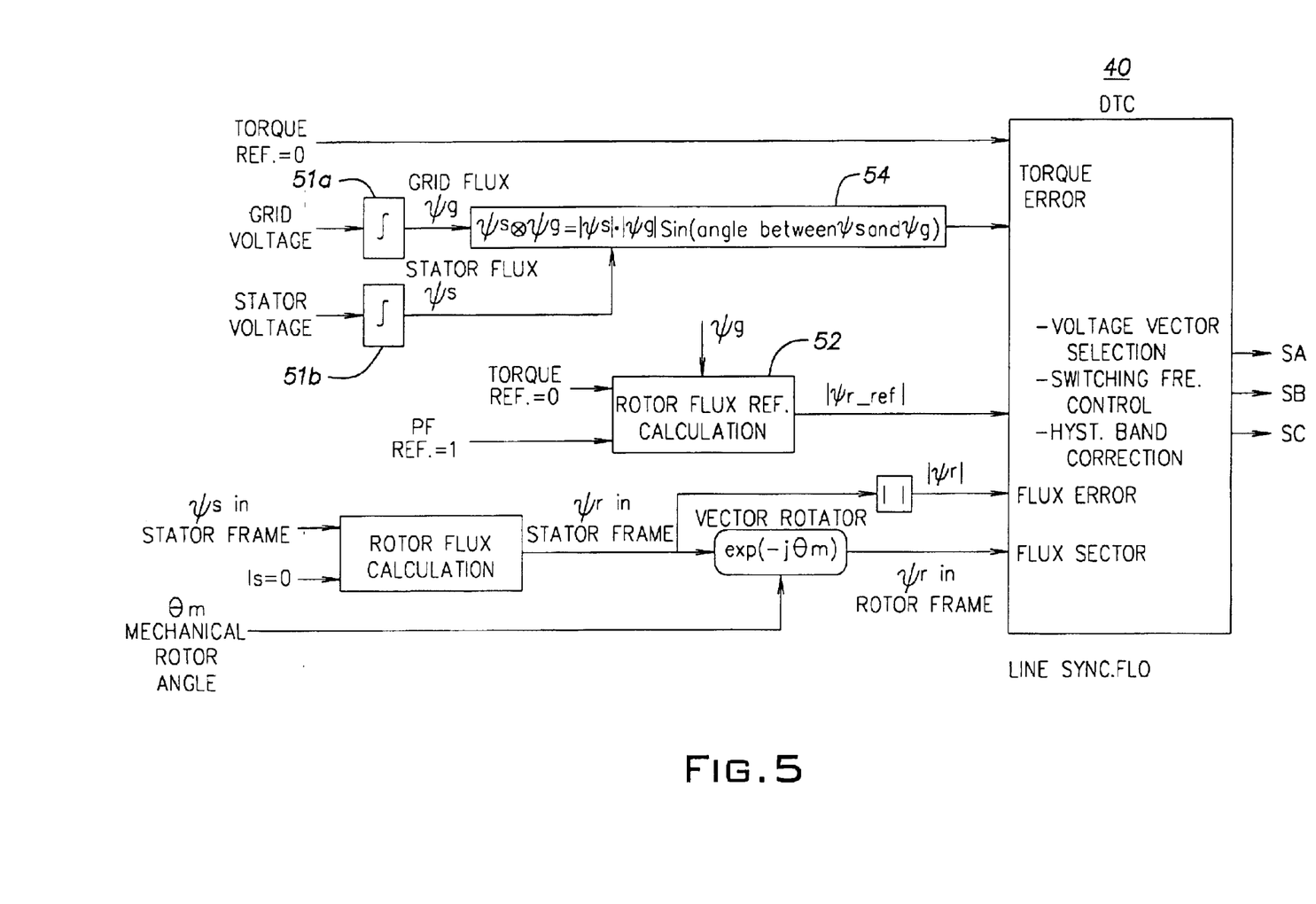
FIG. 5 shows a block diagram for the controller of FIG. 4 wherein the controller operates in a mode to control the synchronization of the machine to the grid.

The synchronization of the generator 20 to the grid 26 using the DTC principle adapted for use in controlling a doubly fed machine is now described. During the start-up sequence, (the switch S2 is open in FIG. 2), it is necessary to achieve synchronization between the stator voltage and grid voltage. The generator 20 is excited from the rotor side 30 so that the induced voltage of the open circuited stator 24 is equal in magnitude and has the same frequency and phase as that of the grid voltage. FIG. 5 shows the block diagram of the controller 40 operating in the mode to provide grid synchronization using the adapted DTC method.

A grid synchronization scheme, using the DTC technique, can be developed using the following logical steps.

1) The synchronization between the stator and grid voltage is the same as the synchronization between the grid flux ψg and stator flux ψs. ψg and ψs are obtained by integrating by the integrators 51a and 51b the grid voltage and the stator voltage, respectively.

2) Since the inverter 28 is connected to the rotor winding 30, the controlled flux vector is the rotor flux vector ψr.

3) Inspection of Eq. 1a reveals that when Is=0 (S2 is open), the vectors for stator and rotor fluxes are always in phase. The magnitude of ψr is higher than the magnitude of ψs by a constant $$\frac{Lr}{M}.$$

Therefore, it is possible to achieve the desired synchronization between the grid flux vector ψg and stator flux vector ψs by controlling the radial length and tangential motion of the rotor flux vector ψr.

The angular error between the grid flux vector ψg (reference vector) and the stator flux ψs is proportional to their cross product as computed by block 54. This angular error is compared in the DTC block 40 with zero and the error signal is used to control the tangential motion of the rotor flux ψr (and therefore, tangential motion of the stator flux ψs) so that the angular difference between the stator flux ψs and the grid flux ψg is always zero.

The "flux" portion of the adapted DTC method in the grid synchronization mode is identical to that of the torque and pf control as shown in FIG. 4 except that the flux reference is generated by block 52 using the measured value of the grid flux ψg. The equation, see Eq. 5 below, for the rotor flux reference Tr_ref is obtained from Eq. 4a by substituting ψg for ψs and setting Torque*=0. The rotor flux estimate for feed back is still calculated from Eq. 1a.

$$\psi r\_ref = \frac{Lr}{M}\psi g \qquad \text{Eq. 5}$$

An integrated torque, power factor and synchronization controller using the adapted DTC principle is described below in connection with FIG. 6. FIG. 4 and FIG. 5 show the two different modes of the integrated controller. The first mode which is shown in FIG. 4 is when S2 is closed and the torque and power factor are controlled. The second mode which is shown in FIG. 5 is when S2 is open and the and the stator voltage is synchronized to the grid. The transition between these two modes, without significant voltage and current transients is very desirable. For example an undesirable third, intermediate, mode between these two modes is possible where, the switch S2 is closed but the controller does not yet know about it. In addition, more control "modes" are not desirable from the point of view of the control architecture. The integrated control structure of the present invention provides a transition between the line sync and torque control modes which is "modeless".

FIG. 6 shows the block diagram of the integrated controller 60 for the doubly fed wind power generator. Controller 60 combines three functions namely, torque control, power factor control and grid synchronization into one integrated control structure. Integrators 61a and 61b perform the same function as integrators 51a and 51b of FIG. 5.

The command input 60a to the "torque" portion of the DTC controller 60 is equal to the external torque command in the normal (torque) mode but it is set to zero during the grid synchronization mode of operation. The feed back for the "torque" portion of the DTC controller 60, that is, the estimated torque at input 60b, is the sum of the outputs of the two computational blocks 62a and 62b. The input to 60b is the estimated torque or a quantity proportional to the angular difference between the grid and stator flux (or voltage). The cross product (ψs ⊗ ψg) computed in block 62a is a measure of the angular difference between the two vectors ψs and ψg. When S2 is open (synchronization mode, Torque=0), this cross product can be used to steer the stator flux ψs to align with the grid flux ψg. Since S2 is open, Is is zero and the second cross product (½(ψs+ψg)⊗ Is) computed in block 62b is zero.

When S2 is closed (normal operational mode), the stator flux ψs and the grid flux ψg are the same and their cross product (ψs⊗ψg)=0. The computational block {½(ψs+ψg)⊗Is} 62b provides the necessary torque estimate. In the normal mode, an alternative way to estimate torque is to replace the computational block 62b with the equation {½(ψs+ψg)⊗ψr)/l}. Since in the normal mode, ψs=ψg, either ψs or ψg or their average value ½(ψs+ψg) can be used to calculate the torque estimate.

The command input at 60c to the "flux" portion of the DTC 60 is the rotor flux command vector ωr_ref computed by block 64 and is given by Eq. 4a. Since Torque is zero and pf* is equal to one during the synchronization mode of operation, Eq. 4a also satisfies the flux command requirement given by Eq. 5. The feed back input to the "flux" portion of the DTC controller 60 at input 60d is the estimated value of the rotor flux computed by block 66 and is given by Eq. 1a. This feed back input is valid during both the normal and synchronization modes of operation of DTC controller 60.

Vector rotator block 68 functions indentically to block 44 of FIG. 4 in that it converts the estimate of the rotor flux vector from block 66 from the stator reference frame to the rotor reference frame. The converted estimate of the rotor flux vector appears at input 60e.

There are three possible modifications to the controller scheme described above. Each of the modifications reduce the cost of the system at the expense of more software complexity. The first modification eliminates the need for the stator voltage measurement circuits which are required only during the synchronization operation. The second and third modifications eliminate the need for a rotor position encoder. Each of these modifications are described below.

The modification that eliminates the need for the stator voltage measurement circuits required only during the synchronization operation is now described. Both the grid flux ψg and the stator flux ψs signals are required only during the synchronization operation. During normal operation of the controller, that is, during control of the torque and the pf, they are the same signals. Therefore, if stator flux ψs can be estimated without explicitly measuring it, this would eliminate the expense of the electronic circuits to measure it. Only during the synchronization operation, can the stator flux (in the rotor reference frame) be estimated by Eq. 6.

$$\hat{\psi}s(\text{rotor ref. frame})=M \cdot Ir \qquad \text{Eq. 6}$$

where M is the mutual inductance and Ir is the measured rotor current

The stator flux in the rotor reference frame can be converted to the (desired) stator reference frame by Eq. 7.

$$\hat{\psi}s=(M \cdot Ir) \cdot e^{-j\theta m} \qquad \text{Eq. 7}$$

where θm is the rotor angle and $\hat{\psi}s$ is the estimated value of the stator flux The estimated value of the stator flux $\hat{\psi}s$ can be used in the place of the measured stator flux ψs in FIG. 6 for the cross product calculations. After the synchronization operation, the switch S2 is closed and the grid flux and stator flux are the same and therefore the measured grid flux can be used to calculate the torque.

The block diagram in FIG. 6 shows how the estimation of the rotor flux is performed in three steps. The stator flux is measured and then a correction is applied per Eq. 1a. Eq. 1a gives the estimation of the rotor flux vector in the stator reference frame. The magnitude of the rotor flux then can be calculated and used as the flux magnitude feed back. Before it is determined in which sector the rotor flux lies, it is necessary to transform by block 68 the rotor flux vector in the stator frame to the rotor frame by performing the vector rotation ($e^{-j\theta m}$) operation.

Once the rotor flux vector in the rotor frame is obtained then its angle and therefore its sector can be calculated. An encoder to measure the rotor angle θm is needed only for this vector rotation operation. Two variations are described below to calculate the angle of the rotor flux vector without the need for an encoder.

In one of the two variations, the rotor flux vector can be calculated by integrating as is shown in Eq. 8 the inverter voltage after taking into account the voltage drop across the rotor resistance. This technique does not need the rotor position information.

$$\psi r = \int (V_{inv} - R_r \cdot Ir) \cdot dt \qquad \text{Eq. 8}$$

Eq. 8 gives the rotor flux vector using the inverter voltage and rotor current vectors as measured inputs. The angle of the rotor flux is given by Eq. 9 below. From the angle $\angle \psi r$, the sector for the rotor flux vector $\psi r$ can be determined from Eq. 9 as follows:

$$\angle \psi r = \tan^{-1}\left(\frac{\psi r_q}{\psi r_d}\right) \text{ where } \psi r_d \text{ and } \psi r_q \text{ are the} \qquad \text{Eq. 9}$$

real and imaginary components of the vector $\psi r$

The disadvantage of this method is that in this application, the rotor inverter voltage and frequency can be very low. At this very low voltage/frequency operation of the inverter, a small error in the rotor resistance estimate can result in a relatively large error in estimation of the rotor flux $\psi r$.

In the other of the two variations, the torque of an induction machine can also be expressed as a function of the rotor current Ir and rotor flux $\psi r$ as shown in Eq. 10.

$$\text{Torque} = \psi s \otimes Is = Ir \otimes \psi r = |Ir| \cdot |\psi r| \cdot \sin(\angle \psi r - \angle Ir) \qquad \text{Eq. 10}$$

It can be observed that the rotor current vector Ir and rotor flux vector $\psi r$ have a phase relationship that is dependent upon the motor torque. Therefore, if the angle of the rotor current Ir, the torque and the magnitudes of Ir and $\psi r$ are known then the angle for the rotor flux vector can be calculated using Eq. 11 below as follows:

$$\angle \psi r = \angle Ir + \sin^{-1}\frac{\text{Torque}}{|Ir| \cdot |\psi r|} = \tan^{-1}\left(\frac{Ir_q}{Ir_d}\right) + \sin^{-1}\frac{\text{Torque}}{|Ir| \cdot |\psi r|} \qquad \text{Eq. 11}$$

where $Ir_d$ and $Ir_q$ are the real and imaginary components of the vector $Ir$ It should be appreciated that as is described herein in connection with the present invention, the rotor flux reference may be calculated using either torque reference, power factor reference and grid flux as given by Eq. 4a or torque reference, volt-amperes reactive reference, stator electrical frequency and grid flux as given by Eq. 4b.

As those of ordinary skill in the art can appreciate, the torque estimate may be calculated as the cross product of either stator flux and stator current or stator flux and rotor flux or rotor flux and stator current or rotor flux and rotor current.

As those of ordinary skill in the art can also appreciate, the rotor flux feedback may be calculated using stator flux and stator current as given by Eq. 1a, stator flux and rotor current as given by Eq. 1b, rotor voltage and rotor current as given by Eq. 1c or rotor current and stator current as given by Eq. 1d.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. An apparatus for controlling the torque and power factor of a doubly fed machine using direct torque control, comprising:

(a) means for calculating the estimated torque of said machine and a desired rotor flux command $\Psi r\_ref$;

(b) means for calculating the actual rotor flux $\Psi r$ and converting said actual rotor flux from the stator reference frame to the rotor reference frame by multiplying $\Psi r$ by $e^{-j\theta m}$; and (c) means for determining a torque error from said estimated torque and a reference torque, and a flux error from said desired rotor flux command and said actual rotor flux converted to the rotor reference frame, said determining means selecting an inverter voltage vector from said torque error and said flux error.

2. The apparatus of claim 1 wherein said estimated torque is calculated as the cross product of the stator flux vector and the stator current of said machine.

3. The apparatus of claim 1 wherein $\Psi r\_ref$ is calculated from the equation:

$$\psi r\_ref = -l \cdot \frac{\text{Torque}^*}{|\psi g|} - j \cdot \left(\frac{Lr}{M} \cdot |\psi g| + \frac{|\text{Torque}^*|}{|\psi g|} \cdot \frac{\sqrt{1-(pf^*)^2}}{pf^*}\right)$$

where l is the leakage reactance, Torque* is the given torque command, pf* is the desired power factor, $\Psi g$ is the grid flux vector, and Lr is the rotor inductance and M is the mutual inductance of said doubly fed machine.

4. The apparatus of claim 1 wherein $\Psi r\_ref$ is calculated from the equation:

$$\psi r\_ref = -l \cdot \frac{\text{Torque}^*}{|\psi g|} - j \cdot \left(\frac{Lr}{M} \cdot |\psi g| + \frac{var^*}{|\psi g| \cdot \omega e}\right)$$

where l is the leakage reactance, Torque* is the given torque command, var* are volt-amperes reactive, $\omega e$ is the electrical frequency of the stator of said doubly fed machine, $\Psi g$ is the grid flux vector, and Lr is the rotor inductance and M is the mutual inductance of said doubly fed machine.

5. The apparatus of claim 1 wherein $\Psi r$ is calculated from the equation:

$$\psi r = \frac{M}{Ls}\psi s + \frac{LsLr - M^2}{Ls}Ir = \frac{M}{Ls}(\psi s + l \cdot Ir)$$

where l is the leakage reactance, $\Psi r$ and $\Psi s$ are the rotor and stator flux vectors of said doubly fed machine, Ir and Is are the rotor and stator currents of said doubly fed machine, and Ls, Lr and M are the stator, rotor and mutual inductances of said doubly fed machine.

6. The apparatus of claim 1 wherein said estimated torque is calculated as the cross product as one half of the sum of the stator flux vector of said machine and the grid flux vector of said electrical grid, and the stator current of said machine.

7. An apparatus for synchronizing a doubly fed machine having an induced stator voltage using direct torque control to an electrical grid having a grid voltage by controlling the tangential motion and radial length of a flux vector for the rotor of said machine, comprising:

(a) means for determining the stator flux vector from said induced stator voltage and the grid flux vector from said grid voltage, said determining means calculating an angular error between said stator flux vector and said grid flux vector;

(b) means for calculating a desired rotor flux command $\Psi r\_ref$;

(c) means for calculating the actual rotor flux Ψr and for converting said actual rotor flux from the stator reference frame to the rotor reference frame by multiplying Ψr by $e^{-j\theta m}$; and (d) means for comparing said angular error to zero to determine an error signal for controlling said rotor flux vector tangential motion, determining a flux error from said desired rotor flux command and said actual rotor flux converted to the rotor reference frame, said flux error for controlling said rotor flux vector radial length, and selecting an inverter voltage vector from said torque error and said flux error.

8. The apparatus of claim 7 wherein said angular error between said stator flux vector and said grid flux vector is calculated from the cross product of said stator flux vector and said grid flux vector.

9. The apparatus of claim 7 wherein Ψr_ref is calculated from the equation:

$$\psi r\_ref = \frac{Lr}{M}\psi g$$

where Lr and M are the rotor and mutual inductances of said doubly fed machine and Ψg is said grid flux vector.

10. The apparatus of claim 7 wherein Ψr is calculated from the equation:

$$\psi r = \frac{M}{Ls}\psi s + \frac{LsLr - M^2}{Ls}Ir = \frac{M}{Ls}(\psi s + l \cdot Ir)$$

where l is the leakage reactance, Ψr and Ψs are the rotor and stator flux vectors of said doubly fed machine, Ir and Is are the rotor and stator currents of said doubly fed machine, and Ls, Lr and M are the stator, rotor and mutual inductances of said doubly fed machine.

11. The apparatus of claim 7 wherein said doubly fed machine is connected to said electrical grid when said rotor flux vector radial length and tangential motion are the same as the radial length and tangential motion of said grid flux vector.

12. An apparatus for synchronizing a doubly fed machine having an induced stator flux vector using direct torque control to an electrical grid having a grid flux vector by controlling the tangential motion and radial length of a rotor flux vector for said machine, comprising:

(a) means for calculating an angular error between said stator flux vector and said grid flux vector;

(b) means for calculating a desired rotor flux command Ψr_ref;

(c) means for calculating the actual rotor flux and converting said actual rotor flux from the stator reference frame to the rotor reference frame by multiplying Ψr by $e^{-j\theta m}$; and (d) means for comparing said angular error to zero to determine an error signal for controlling said rotor flux vector tangential motion, determining a flux error from said desired rotor flux command and said actual rotor flux converted to the rotor reference frame, said flux error for controlling said rotor flux vector radial length, and selecting an inverter voltage vector from said torque error and said flux error.

13. The apparatus of claim 12 wherein said angular error between said stator flux vector and said grid flux vector is calculated from the cross product of said stator flux vector and said grid flux vector.

14. The apparatus of claim 12 wherein Ψr_ref is calculated from the equation:

$$\psi r\_ref = \frac{Lr}{M}\psi g$$

where Lr and M are the rotor and mutual inductances of said doubly fed machine and Ψg is said grid flux vector.

15. The apparatus of claim 12 wherein Ψr is calculated from the equation is:

$$\psi r = \frac{M}{Ls}\psi s + \frac{LsLr - M^2}{Ls}Ir = \frac{M}{Ls}(\psi s + l \cdot Ir)$$

where l is the leakage reactance, Ψr and Ψs are the rotor and stator flux vectors of said doubly fed machine, Ir and Is are the rotor and stator currents of said doubly fed machine, and Ls, Lr and N are the stator, rotor and mutual inductances of said doubly fed machine.

16. The apparatus of claim 12 wherein said doubly fed machine is connected to said electrical grid when said rotor flux vector radial length and tangential motion are the same as the radial length and tangential motion of said grid flux vector.

17. The apparatus of claim 12 wherein said doubly fed machine has an induced stator voltage and said electrical grid has a grid voltage and said means for calculating the angular error integrates said induced stator voltage to obtain said stator flux vector and said grid voltage to obtain said grid flux vector.

18. A controller for controlling the torque and power factor of a doubly fed machine using direct torque control comprising:

switch means for selecting either a first operating mode of said controller for controlling the torque and power factor of said machine or a second operating mode of said controller for synchronizing said machine to an electrical grid;

said controller comprising when said first operating mode is selected:
  means for calculating the estimated torque of said machine;
  means for calculating a desired rotor flux command Ψr_ref;
  means for calculating the actual rotor flux Ψr and converting said actual rotor flux from the stator reference frame to the rotor reference frame by multiplying Ψr by $e^{-j\theta m}$; and
  means for determining a torque error from said estimated torque and a reference torque and a flux error from said desired rotor flux command and said actual rotor flux converted to the rotor reference frame and for selecting an inverter voltage vector from said torque error and said flux error.

19. The controller of claim 18 wherein said estimated torque of said machine is calculated as the cross product of the one-half of the sum of the stator flux vector of said machine and the grid flux vector of said electrical grid, and the stator current of said machine.

20. The controller of claim 18 wherein Ψr_ref is calculated from the equation:

$$\psi r\_ref = -l \cdot \frac{\text{Torque}^*}{|\psi g|} - j \cdot \left( \frac{Lr}{M} \cdot |\psi g| + \frac{|\text{Torque}^*|}{|\psi g|} \cdot \frac{\sqrt{1-(pf^*)^2}}{pf^*} \right)$$

where l is the leakage reactance, Torque* is the given torque command, pf* is the desired power factor, Ψg is the grid flux vector, and Lr is the rotor inductance and M is the mutual inductance of said doubly fed machine.

21. The controller of claim 18 wherein Ψr_ref is calculated from the equation:

$$\psi r\_ref = -l \cdot \frac{\text{Torque}^*}{|\psi g|} - j \cdot \left( \frac{Lr}{M} \cdot |\psi g| + \frac{\text{var}^*}{|\psi g| \cdot \omega e} \right)$$

where l is the leakage reactance, Torque* is the given torque command, var* are volt-amperes reactive, ωe is the electrical frequency of the stator of said doubly fed machine, Ψg is the grid flux vector, and Lr is the rotor inductance and M is the mutual inductance of said doubly fed machine.

22. The controller of claim 18 wherein Ψr is calculated from the equation:

$$\psi r = \frac{M}{Ls} \psi s + \frac{LsLr - M^2}{Ls} Ir = \frac{M}{Ls}(\psi s + l \cdot Ir)$$

where l is the leakage reactance, Ψr and Ψs are the rotor and stator flux vectors of said doubly fed machine, Ir and Is are the rotor and stator currents of said doubly fed machine, and Ls, Lr and M are the stator, rotor and mutual inductances of said doubly fed machine.

23. The controller of claim 18 wherein said machine has an induced stator flux vector and said electrical grid has a grid flux vector and said machine is synchronized to said grid by controlling the tangential motion and radial length of a rotor flux vector for said machine, said controller further comprising when said second operating mode is selected means for calculating the angular error between said stator flux vector and said grid flux vector;

said means for determining a flux error from said desired rotor flux command and said actual rotor flux converted to the rotor reference frame also comparing said angular error to zero to determine an error signal for controlling said rotor flux vector tangential motion, said flux error for controlling said rotor flux vector radial length.

24. The controller of claim 23 wherein when said second operating mode is selected said angular error between said stator flux vector and said grid flux vector is calculated from the cross product of the stator flux vector and the grid flux vector.

25. The controller of claim 23 wherein when said second operating mode is selected Ψr_ref is calculated from the equation:

$$\psi r\_ref = \frac{Lr}{M} \psi g$$

where Lr and M are the rotor and mutual inductances of said doubly fed machine and Ψg is said grid flux vector.

26. The controller of claim 23 wherein when said second operating mode is selected Ψr is calculated from the equation:

$$\psi r = \frac{M}{Ls} \psi s + \frac{LsLr - M^2}{Ls} Ir = \frac{M}{Ls}(\psi s + \ell \cdot Ir)$$

where l is the leakage reactance, Ψr and Ψs are the rotor and stator flux vectors of said doubly fed machine, Ir and Is are the rotor and stator currents of said doubly fed machine, and Ls, Lr and M are the stator, rotor and mutual inductances of said doubly fed machine.

* * * * *